United States Patent
Ustinov

(10) Patent No.: US 8,403,254 B2
(45) Date of Patent: Mar. 26, 2013

(54) AERO-ASSISTED PRE-STAGE FOR BALLISTIC ROCKETS AND AERO-ASSISTED FLIGHT VEHICLES

(76) Inventor: Eugene Alexis Ustinov, Altadena, CA (US)

( * ) Notice: Subject to any disclaimer, the term of this patent is extended or adjusted under 35 U.S.C. 154(b) by 473 days.

(21) Appl. No.: 12/658,656

(22) Filed: Feb. 12, 2010

(65) Prior Publication Data

US 2011/0198434 A1 Aug. 18, 2011

(51) Int. Cl.
*B64D 5/00* (2006.01)
*B64G 1/40* (2006.01)
*B64G 1/62* (2006.01)

(52) U.S. Cl. .................. 244/2; 244/158.9; 244/171.4

(58) Field of Classification Search ........... 244/2, 158.9, 244/159.1, 171.3, 171.4
See application file for complete search history.

(56) References Cited

U.S. PATENT DOCUMENTS

| | | | | |
|---|---|---|---|---|
| 3,006,576 A * | 10/1961 | Elijah | | 244/2 |
| 3,289,974 A * | 12/1966 | Cohen et al. | | 244/159.3 |
| D220,980 S * | 6/1971 | Becker et al. | | D12/334 |
| D220,983 S * | 6/1971 | Becker et al. | | D12/334 |
| 4,802,639 A * | 2/1989 | Hardy et al. | | 244/2 |
| 4,901,949 A | 2/1990 | Elias | | |
| 5,090,642 A * | 2/1992 | Salkeld | | 244/171.3 |
| 5,255,873 A | 10/1993 | Nelson | | |
| 5,295,642 A * | 3/1994 | Palmer | | 244/2 |
| 5,402,965 A * | 4/1995 | Cervisi et al. | | 244/2 |
| 5,456,424 A * | 10/1995 | Palmer | | 244/2 |
| 5,564,648 A * | 10/1996 | Palmer | | 244/2 |
| 5,626,310 A | 5/1997 | Kelly | | |
| 5,740,985 A * | 4/1998 | Scott et al. | | 244/2 |
| 6,029,928 A | 2/2000 | Kelly | | |
| 6,068,211 A * | 5/2000 | Toliver et al. | | 244/2 |
| 6,119,985 A * | 9/2000 | Clapp et al. | | 244/171.4 |
| 6,193,187 B1 * | 2/2001 | Scott et al. | | 244/2 |
| 6,257,527 B1 * | 7/2001 | Redding et al. | | 244/159.1 |
| 6,398,166 B1 * | 6/2002 | Ballard et al. | | 244/158.1 |
| 6,530,543 B2 * | 3/2003 | Redding et al. | | 244/159.1 |
| 7,753,315 B2 * | 7/2010 | Troy | | 244/171.3 |
| 8,168,929 B2 | 5/2012 | Ustinov | | |
| 2001/0048051 A1 * | 12/2001 | Redding et al. | | 244/162 |
| 2003/0080241 A1 * | 5/2003 | Shpigler et al. | | 244/2 |
| 2004/0021040 A1 * | 2/2004 | Redding et al. | | 244/162 |
| 2005/0230517 A1 * | 10/2005 | Troy | | 244/2 |
| 2009/0179106 A1 * | 7/2009 | Ustinov | | 244/2 |

OTHER PUBLICATIONS

Sarigul-Klijn, A Study of Air Launch Methods for RLV's, AIAA Paper 2001-4619.

* cited by examiner

*Primary Examiner* — Joseph W Sanderson

(57) ABSTRACT

An aero-assisted pre-stage (10) with a commensurably large wing area having a short-burn rocket propulsion system providing sufficient thrust is used to launch a variety of single-stage and multiple-stage space vehicles (20), such as conventional ballistic rockets and prospective spaceplanes, from conventional runways. This method of launch eliminates the need for dedicated ground launch structures and/or dedicated long runways. The vehicle to be launched (20) is mated to this aero-assisted pre-stage (AP) (10), with their flight directions aligned, using a lock-and-release mechanism (30). The resulting stack takes off like a conventional airplane using the propulsion and aerodynamic lift of the AP. After the desired trajectory of the vehicle is achieved and propulsion system of the AP is shut down, the vehicle is separated from the AP, the propulsion system of the vehicle is ignited, and the vehicle continues its ascent. The AP returns back to the surface for reuse or disposal. Thus, a wide variety of conventional airfields can be used for launch of ballistic and aero-assisted flight vehicles, without any payload mass penalties.

18 Claims, 4 Drawing Sheets

AERO-ASSISTED PRE-STAGE FOR BALLISTIC ROCKETS AND AERO-ASSISTED FLIGHT VEHICLES

CROSS-REFERENCE TO RELATED APPLICATION

None

FEDERALLY SPONSORED RESEARCH

Not Applicable

SEQUENCE LISTING OR PROGRAM

Not Applicable

BACKGROUND

1. Field

This application generally relates to the launch of flight vehicles, specifically to enabling the launch of ballistic rockets and aero-assisted flight vehicles (spaceplanes) from conventional runways, without use of, respectively, dedicated ground launch structures or dedicated runways.

2. Prior Art

From the dawn of Space Era through present time, all space launches—sub-orbital, orbital, and beyond—have been accomplished almost solely using ballistic (wingless) rockets launched from the ground. This approach requires dedicated ground launch structures for assembling and servicing the rockets before launch. Also, the launch structure must hold the rocket in a vertical position until lift-off and must deflect the exhaust plume in a safe direction to prevent erosion of the ground and structure under the launch pad. These launch structures are expensive to build and expensive to operate. There are a limited number of them around the world, which places substantial operational limitations on access to space.

An alternative to a vertically launched ballistic rocket is an aero-assisted "winged" spacecraft, or a spaceplane—a vehicle which can take off horizontally from a runway like a conventional airplane. Such a spaceplane is known as an aero-assisted vehicle because it uses wings and their interaction with the air to provide lift. In order to minimize aerodynamic losses during ascent through the atmosphere, the spaceplane must have high wing loading; i.e., the ratio of the spaceplane's weight to its wing area must be relatively large. As a result, such high wing loading entails extremely high take-off airspeed, which is incompatible with the use of the runways of most conventional airfields.

The use of a non-powered glider to launch an aero-assisted spacecraft or spaceplane from a conventional runway is discussed in U.S. Pat. No. 5,255,873 to R. Nelson (1993). Nelson proposed a non-powered reusable wing glider attached to the upper surface of the spaceplane to form a glider-spaceplane "stack". Nelson envisioned a prolonged subsonic flight of the stack through a substantial part of the lower, dense atmosphere, with staging (separation of the wing glider from the spaceplane) occurring at an altitude of about 5 km. Thus, the wing area of the glider is substantially constrained in order to reduce atmospheric drag, resulting in a very high take-off airspeed of over 500 km/h (280 knots). This requirement for very high take-off airspeed is unrealistic since it greatly exceeds existing technical capabilities of conventional technologies used for the undercarriage of existing flight vehicles, it also severely limits the choice of acceptable runways that can accommodate such operation.

In addition, Nelson's glider had no undercarriage and was dependent upon the spaceplane to provide an undercarriage, thus limiting payload diversity. The undercarriage was subsequently dropped from the spaceplane after take-off Also, the wing planform (i.e., the contour of the wing as viewed from above) of the glider was constrained to a specific shape configured with a high aspect ratio. This limitation resulted in weaker mechanical strength as compared, for example, with a delta wing, which has an aspect ratio close to unity. In addition to the above, Nelson's glider could not be used as a launch platform for ballistic rockets. To best of my knowledge, this concept was never used for launch to space.

Another alternative to the launch of ballistic rockets from the ground is an air-deployed, lift-assisted launch. The vehicle to be launched is carried to the desired launch point by a customized airplane. At the launch point, the vehicle is released from the airplane, and the propulsion system of the vehicle is activated. This method of launch has been known for a few decades. A detailed review of various versions of this approach is published by N. & M. Sarigul-Klijn (AIAA Paper 2001-4619). The only successful implementation of this approach for actual launches to space that I am aware of is the launch of a ballistic rocket suspended under a conventional aircraft, as shown in U.S. Pat. No. 4,901,949 to A. Elias (1990). In this method, the rocket is partially aero-assisted. It has a small wing to facilitate initial ascent of the vehicle.

As for the launch of aero-assisted vehicles, the only approaches I have found are shown in U.S. Pat. Nos. 5,626,310 and 6,029,928 to M. Kelly (1997, 2000). Kelly envisioned towing the aero-assisted launch vehicle as a glider by a conventional aircraft. Due to high wing loading of the vehicle, the towing plane must take off while the towed vehicle to be launched is still rolling out. Thus a relatively long runway is required. Insofar as I am aware, this method has never been used in practice.

Lift-assisted, air-deployed launch of spaceplanes is also known. The research rocket plane X-15, made by North American Rockwell, was the first spaceplane in early 60s of the last century that actually reached space beyond altitude of 100 km. More recently, a private spaceplane named SpaceShipOne, made by Scaled Composites, made three successful flights to space to even higher altitudes. X-15 was launched from a customized B-52 bomber, and SpaceShipOne was launched from a custom-made high-altitude jet plane named White Knight.

In all known air-launch methods, the vehicle is delivered to the desired launch altitude high in the atmosphere by the carrier aircraft as a passive payload. This places a substantial limitation on the initial weight of the launch vehicle. Not incidentally, Orbital Sciences Corp., the assignee of the Elias patent, is currently using this method for launches of their smallest rocket, Pegasus, while larger rockets produced by this company are launched from conventional ground facilities.

To sum, ground launch to space is associated with need to use expensive ground structures for rockets and/or dedicated runways for spaceplanes. The air-launch to space is associated with limitations on initial weight for space launch vehicles, both rockets and spaceplanes. Thus all launches of rockets and spaceplanes to space have heretofore substantial operational limitations.

My patent (U.S. Pat. No. 8,168,929) shows a non-powered pre-stage with a commensurably large wing area for launching a variety of single-stage and multiple-stage space vehicles, (e.g., conventional ballistic rockets and prospective spaceplanes) from conventional runways. This method of launch eliminates need for dedicated ground launch structures and/or dedicated long runways. The vehicle to be launched is mated to a non-powered aero-assisted pre-stage (NAP), with their flight directions aligned, using a lock-and-release mechanism. The resulting stack takes off like a conventional airplane using the propulsion of the vehicle and aerodynamic lift of the NAP. After the desired trajectory of the vehicle is achieved, the vehicle is separated from the NAP and continues its ascent. The NAP returns to the surface for reuse or disposal. Thus, a wide variety of conventional airfields can be used for launch of ballistic and aero-assisted flight vehicles. The key benefit of the NAP is the capability to enable the launch of ballistic rockets and aero-assisted flight vehicles from conventional runways. However, early use of the propulsion system of the vehicle to be launched, before the vehicle reaches the desired ascent trajectory, may lead to additional expenditures of propellant, which in turn could result in payload mass penalties.

SUMMARY

In accordance with one aspect, the launch of a space vehicle (a rocket and/or spaceplane) is assisted by attaching it to a powered aircraft that has an undercarriage and wings to enable take-off at a conveniently low take-off airspeed. The aircraft has a short-burn rocket propulsion system to provide sufficient thrust-to-weight ratio for takeoff and climb to a separation point, and control surfaces to provide flight control during launch and return to ground. The launch is conducted in the form of an aircraft-like take-off from a conventional runway. I call this aircraft an Aero-assisted Pre-stage (AP). The AP facilitates horizontal launch of the space vehicle, with aerodynamic lift, propulsion and roll-out capability provided by the AP. Ample thrust from the short-burn propulsion system is combined with ample wing area of the AP, which is not constrained by the common prior requirement, to fly through a substantial part of the lower atmosphere. This enables short-distance take-off at conventional airspeeds and releasing of the space vehicle as soon as safe altitude of a few hundred meters is achieved.

The space vehicle is released from the AP as soon as safe separation altitude is reached, whereupon the propulsion system of the AP is shut down (burns out) and the propulsion system of the vehicle is activated (ignited). The space vehicle begins its ascent to space, and the AP glides back to the ground. In other words, the AP is a highly flexible, self-contained, pre-stage powered-glider platform capable of accepting an extensive variety of payloads ranging from spaceplanes to ballistic rockets and carrying these payloads to a suitable launch orientation and altitude, and returning to Earth and landing after separation. Furthermore, its wing design is preselected to adapt to the chosen payload so that moderate take-off airspeeds can be maintained, thus enabling launch operations from conventional runways. The propulsion system of the AP enables the launch vehicle with 100% of its propellant be brought to a non-zero altitude at a non-zero velocity. Ignition under non-zero-altitude and non-zero-velocity conditions provides definite savings of the propellant of the launch vehicle as compared with a conventional launch from the ground. This, in turn, results in a gain of payload mass delivered by the launch vehicle.

DRAWINGS

Figures

REFERENCE NUMERALS

10—Aero-assisted pre-stage (AP)
11—Vertical stabilizer, a fin
12A—Control surface, an elevon
12B—Control surface, a rudder
12C—Control surface, an elevator
12D—Control surface, an aileron
13—Main landing gear employing wheels, floats, air cushions, or skids
14—Nose landing gear employing wheels, floats, air cushions, or skids
15—Wing struts
16—Wing wires
17—Longitudinal notch
18—Low-power strap-on self-transportation propulsion means
19—Rocket propulsion system (rocket nozzles are shown)
20A—Vehicle to be launched, a ballistic rocket
20B—Vehicle to be launched, an aero-assisted vehicle
30—Hold-and-release mechanism

DETAILED DESCRIPTION

First Embodiment

Custom-Designed AP as Pre-Stage of Rocket

FIG. 1A

Figure 1A:
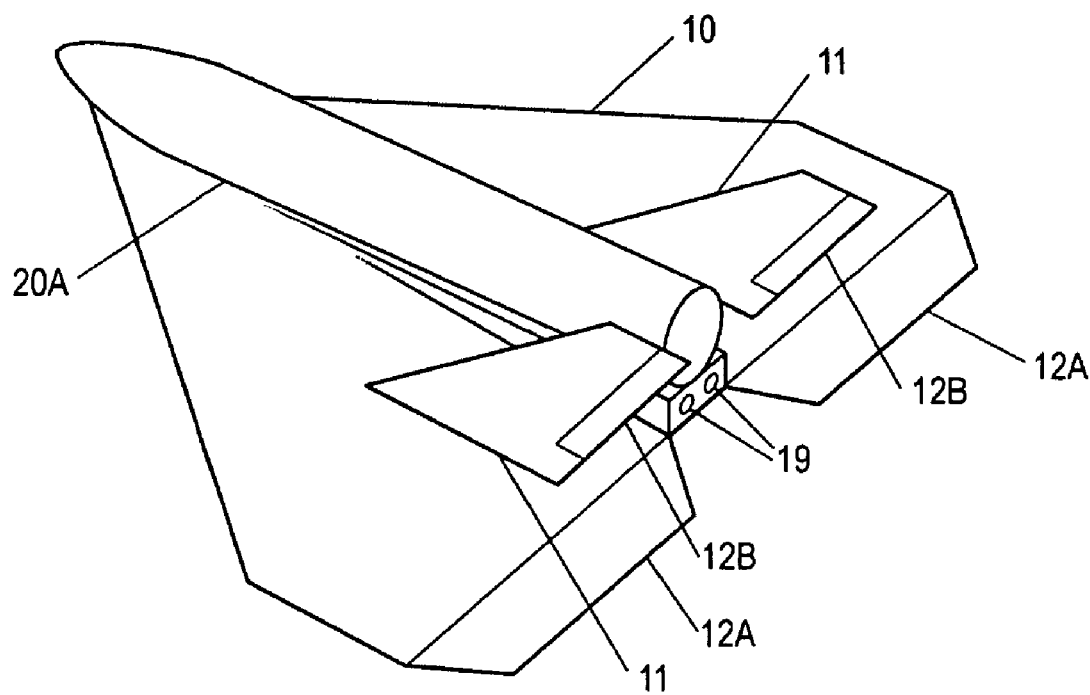
FIGS. 1A and 1B are perspective views of AP-vehicle stack for use with a ballistic rocket (FIG. 1A) and with an aero-assisted flight vehicle (FIG. 1B), the AP being a custom-made delta-wing powered glider.

FIG. 1A shows a first embodiment of an airframe or aircraft structure 10 for assisting the launch of a ballistic rocket 20A. Airframe 10 is an ascent-assisting means or Aero-assisted Pre-stage, hereafter AP. AP 10 is implemented as a custom-designed delta-wing powered glider to be used as a pre-stage for a rocket 20A. Rocket 20A may be either a single- or multiple-stage ballistic rocket, both of which are well-known in the art, and it may or may not have personnel or animals on board. The AP may have various alternative forms as will be disclosed; reference numeral "10" refers to all of these forms.

As stated, heretofore ballistic rockets were launched either (1) from the ground, or (2) from a customized airplane as high in the atmosphere as possible. The first approach requires expensive ground structures. The second approach places substantial limitations on the initial weight of the rocket. Use of the AP eliminates both problems: AP 10 enables launch of ballistic rocket 20A using a conventional runway instead of dedicated ground structures. Unlike prior-art arrangements, the separation of AP 10 from rocket 20A occurs at a low altitude, i.e., a few hundred meters, and it does not hinder subsequent ascent of a rocket through dense lower atmosphere. Because of this, the wing area of AP 10 can be large enough to enable the take-off of the AP-vehicle stack at a reasonably low airspeed, comparable or even less than that of conventional jet aircraft. Unlike the NAP implementation of my above copending application, the AP has its own integral short-burn propulsion system. Use of dedicated propulsion eliminates possible propellant and payload mass penalties of the vehicle to be launched, which may have a bearing on the use of the NAP.

In order to facilitate the launch of vehicle 20A it is mated to AP 10 so that the flight directions of vehicle 20A and AP 10 are aligned, and they form a rigid stack. The airframe of AP 10 has a suitable aerodynamic shape to provide aerodynamic lift and an own propulsion system 19 to provide thrust sufficient for take-off and ascent until separation. AP 10 has a suitable undercarriage (not shown) to enable it to take-off from a runway or aircraft carrier. In the embodiment of FIG. 1A, AP 10 is a delta-wing glider with an aspect ratio close to unity, which ensures enhanced mechanical strength, thus minimizing the weight of the AP. AP 10 has two fins 11 and control surfaces in the form of elevons 12A and rudders 12B. Elevons 12A and rudders 12B are operated by a flight control system (not shown), which is implemented based on well-known engineering solutions of flight control systems of unmanned aerial vehicles (UAVs). The nozzles of propulsion system 19 of the AP are situated on the trailing edge of the AP.

Vehicle 20A is carried on the upper surface of AP 10. It is mated to the AP using a conventional hold-and-release mechanism (not shown). The method of mating vehicle 20A to AP 10 is well known to those who are familiar with the engineering solutions involved in launch of missiles and rockets from aircraft or ground launchers. For example, the mating hardware used for the air-to-air missile AIM-54 Phoenix and surface-to-air missile MIM-23 Hawk may be used with suitable size and strength modifications. Thus, although details may vary with the weight of vehicle 20A, the principles are well-developed and can be easily implemented on a case-by-case basis.

Operation—First Embodiment in Conjunction with Ballistic Rocket

Operation of first embodiment is as follows. The AP-vehicle stack is placed on the runway. The engine of the rocket is ignited, the AP-vehicle stack rolls-out (i.e., accelerates along the horizontal runway to take-off speed), takes off, and climbs to the separation point at an altitude of a few hundred meters. During this phase, control surfaces of the AP are used for flight control in a conventional manner.

At the separation point, the propulsion system of the AP is shut down (burns out), the hold-and-release mechanism separates vehicle 20A from AP 10, and the propulsion system of the vehicle 20A is activated (ignited). After separation, AP 10 makes a 180-degree turn, and glides back to the launch site for subsequent reuse or disposal being guided by its flight control system. Vehicle 20A then proceeds along its ascent trajectory in conventional fashion.

Second Embodiment

Custom Designed AP as a Pre-Stage of a Spaceplane

FIG. 1B

Figure 1B:
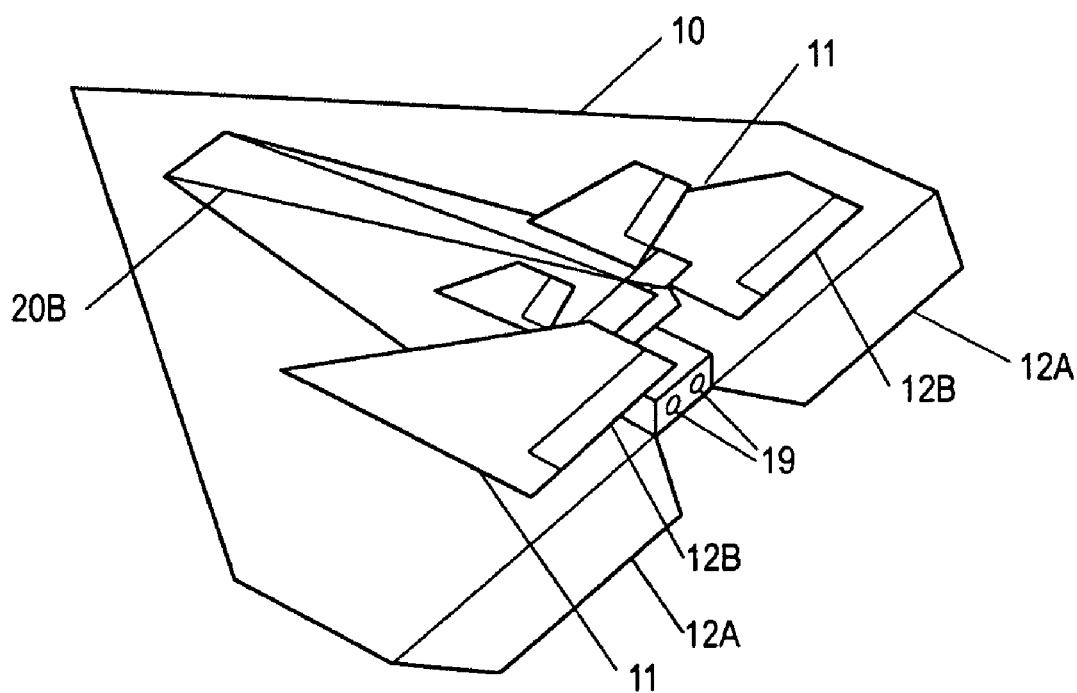

FIG. 1B shows a second embodiment of AP 10 implemented as a custom-designed delta-wing glider to be used as a pre-stage of an aero-assisted single-stage or multi-stage flight vehicle (spaceplane) 20B. As stated above, in existing prior-art arrangements spaceplanes were launched either (1) from the runway at unrealistically high take-off airspeeds, or (2) from customized airplanes. The first approach placed extraordinary requirements that greatly exceed existing technical capabilities of conventional technologies used for the undercarriage of existing flight vehicles. Also, it severely limited the choice of acceptable runways that can accommodate such operation. The second approach placed substantial limitations on the initial weight of the spaceplane.

Use of the AP eliminates both problems: AP 10 enables the launch of spaceplane 20B from a conventional, rather than from a dedicated runway. Unlike prior-art arrangements, separation of AP 10 from spaceplane 20B occurs at a low altitude, a few hundred meters, and it does not hinder subsequent ascent of the spaceplane through dense lower atmosphere. Because of this, as with launch of ballistic rockets, the wing area of AP 10 can be large enough to enable the take-off of the AP-vehicle stack at a reasonably low airspeed, comparable or even less than that of conventional jet aircraft. As with launch of ballistic rockets, use of the spaceplane's power after separation at low altitude lifts limitations on the initial weight of the spaceplane, which are associated with air-launch at high altitude.

In order to facilitate the launch of vehicle 20B it is mated to AP 10 so that they form a rigid stack with flight directions of vehicle 208 and AP 10 aligned. The airframe of AP 10 has a suitable aerodynamic shape to provide aerodynamic lift and a propulsion system 19 to provide thrust sufficient for take-off and ascent until separation. AP 10 has a undercarriage (not shown) to enable its take-off from a runway or aircraft carrier. In the embodiment of FIG. 18, AP 10 is a delta-wing glider with aspect ratio close to unity, which ensures enhanced mechanical strength, thus minimizing own weight of the AP. AP 10 has two fins 11 and control surfaces in the form of elevons 12A and rudders 128. Elevons 12A and rudders 12B are operated by a flight control system (not shown) implemented on the same engineering solutions as for the first embodiment in conjunction with ballistic rockets. The nozzles of propulsion system 19 of the AP are situated on the trailing edge of the AP.

Vehicle 20B is carried on the upper surface of AP 10. It is mated to the AP using a conventional hold-and-release mechanism 30 (not shown). As stated, the method of mating vehicle 20B to AP 10 is well known to those who are familiar with the engineering solutions involved in mating of the Space Shuttle Orbiter to its External Tank for space launch, or to the Boeing 747 Shuttle Carrier Aircraft for transportation by air to Kennedy Space Center. Although details may vary with the weight of vehicle 20B, the principles are well-developed and can easily be implemented for the present AP-vehicle stack.

Operation—Second Embodiment in Conjunction with Spaceplane

Operation of the second embodiment of FIG. 1B with the spaceplane proceeds in essentially the same way as with the ballistic rocket of FIG. 1A. The AP-vehicle stack is placed on the runway. The engine of the AP is ignited, the AP-vehicle stack rolls-out, takes off, and climbs to a separation point using propulsion from vehicle. During this phase, control surfaces of the AP are used for flight control in a conventional manner.

At the separation point, the propulsion system of the AP is shut down (burns out), the hold-and-release mechanism separates vehicle 20B from AP 10, and the propulsion system of the vehicle 20B is activated (ignited). After separation, AP 10 makes a 180-degree turn, and glides back to the launch site for subsequent reuse or disposal being guided by its flight control system. Vehicle 20B then proceeds along its ascent trajectory in conventional fashion.

Third Embodiment

Modification of a Suitable Airplane

Figure 2A:
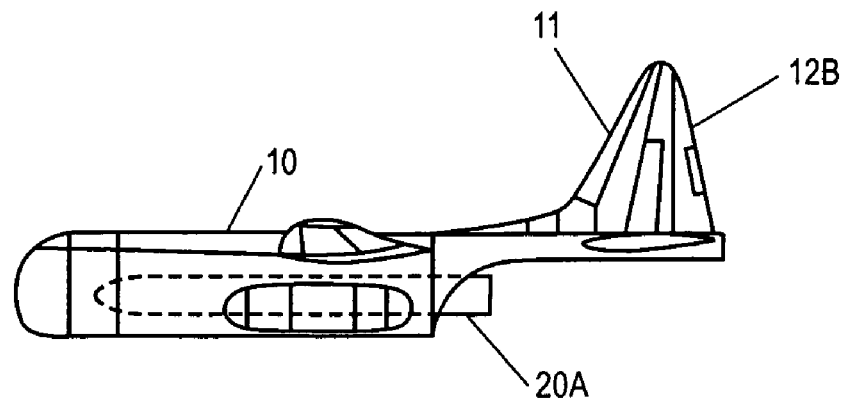
FIGS. 2A to 2C are side, bottom, and rear views respectively of an AP-vehicle stack for use with a ballistic rocket. The AP shown is converted from an existing aircraft.
Figure 2B:
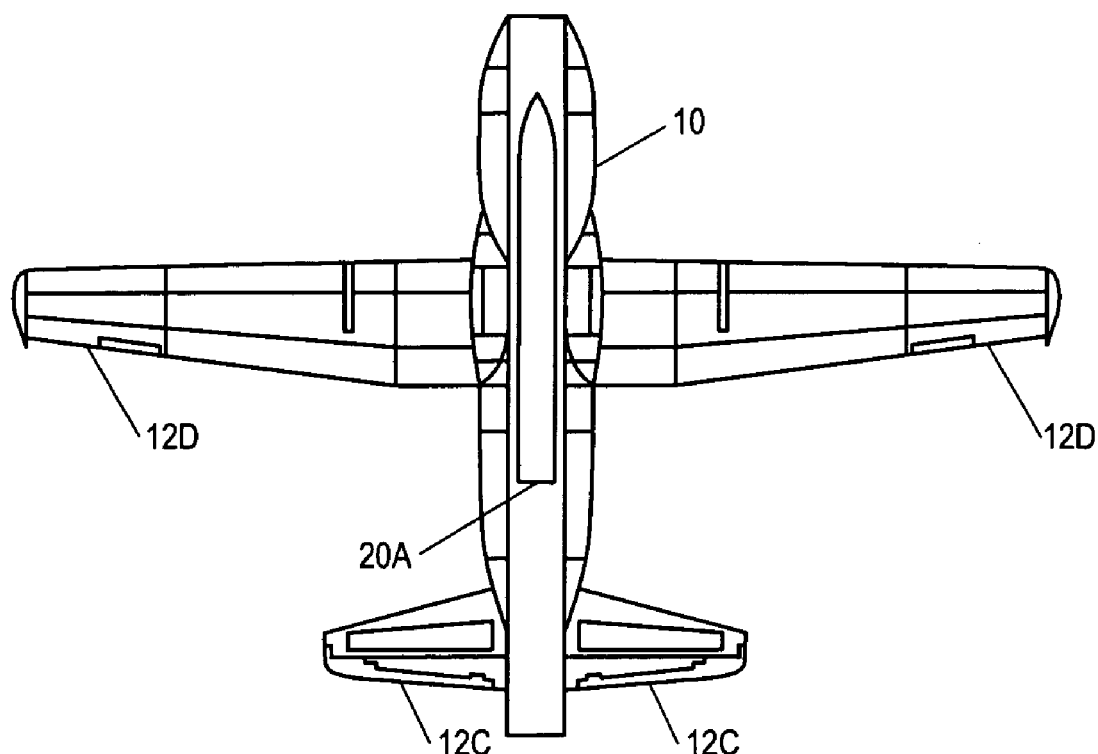
Figure 2C:
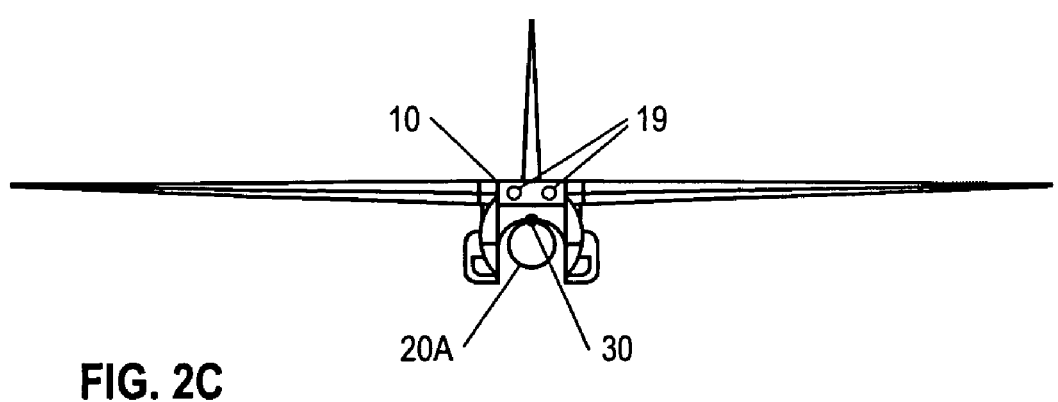

FIGS. 2A, 2B, and 2C

A third embodiment of the AP is illustrated in FIGS. 2A, 2B, and 2C in conjunction with a single-stage or multi-stage ballistic rocket. FIGS. 2A, 2B, and 2C are three-views of AP 10 and ballistic rocket 20A. In this embodiment AP 10 is implemented as a modification of a suitable airplane (a C-130 Hercules cargo plane in this example). All non-essential, superfluous systems are removed, and the airframe of the airplane is modified to open the inner volume of the airplane in the downward, forward, and backward directions so as to provide an unobstructed path for rocket 20A after it is dropped from the AP and accelerates forward. This arrangement also prevents the exhaust plume of the rocket engine (not shown) from damaging the AP 10.

The main landing gear (not shown) of the airplane can be used without modifications. The nose landing gear is split into two separate nose gear components (not shown) to provide an unobstructed path for the forward motion of rocket 20A after separation from AP 10. The control surfaces of the airplane—rudder 12B, elevators 12C, and ailerons 12D—are used without modifications. These control surfaces are operated by a flight control system (not shown), which, as in the first embodiment, is implemented based on engineering solutions of flight control systems of unmanned aerial vehicles. The nozzles of propulsion system 19 of the AP are situated in the tail of the AP beneath the rudder 12B. Rocket 20A is mated to AP 10 using a conventional hold-and-release mechanism 30 (FIG. 2C) as before with suitable adjustments for the present stack.

Operation—Third Embodiment

Operation of the third embodiment is similar to that of the first embodiment. The stack rolls-out on a conventional runway, takes off, and climbs to the separation point in a fashion conceptually identical to those of the first and second embodiments. At the separation point, the propulsion system of the AP is shut down (burns out), hold-and-release mechanism 30 releases rocket 20A from AP 10, the propulsion system of the vehicle 20A is activated (ignited), and the AP proceeds downward. Separation is assisted by the gravity component across the flight path. After separation, the operation proceeds similarly to the operation of the first embodiment: AP 10 glides back to the launch site for subsequent reuse or disposal being guided by its flight control system, and rocket 20A proceeds along its ascent trajectory in conventional fashion.

Other Embodiments

FIGS. 3A to 3C and 4A to 4C

Figure 3A:
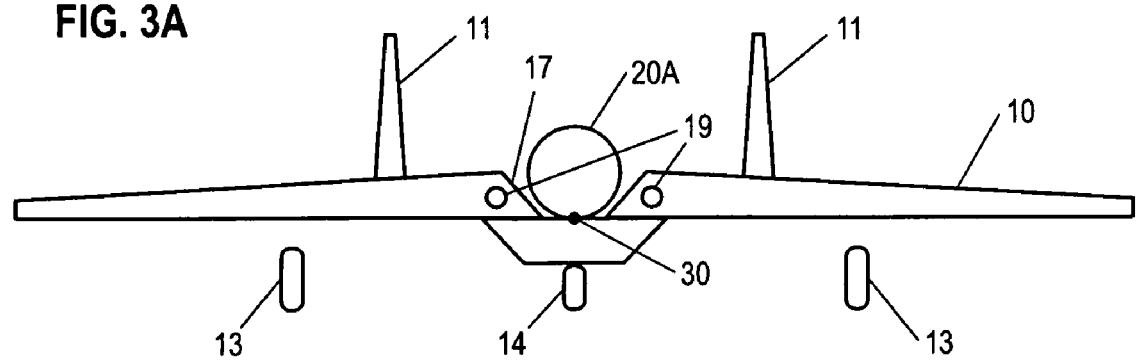
FIGS. 3A to 3C are views of the AP-vehicle stack for a ballistic rocket showing various embodiments of the AP as a custom-made, delta-wing glider with three different ways of mating the vehicle to the AP.
Figure 3B:
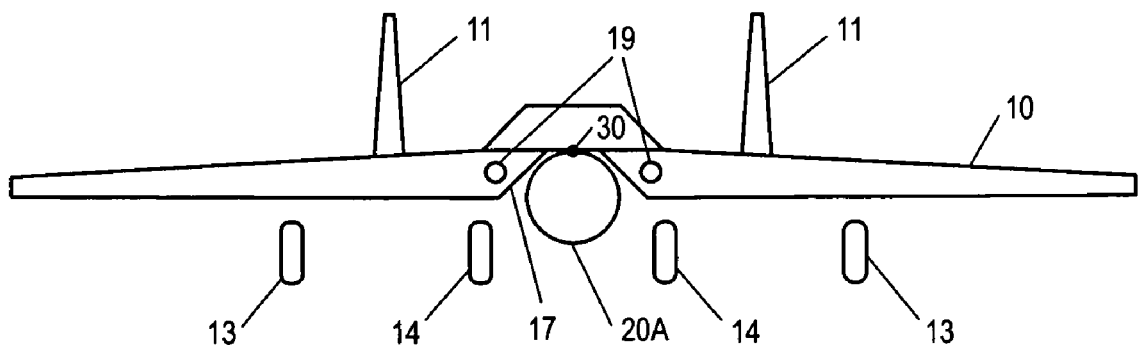
Figure 3C:
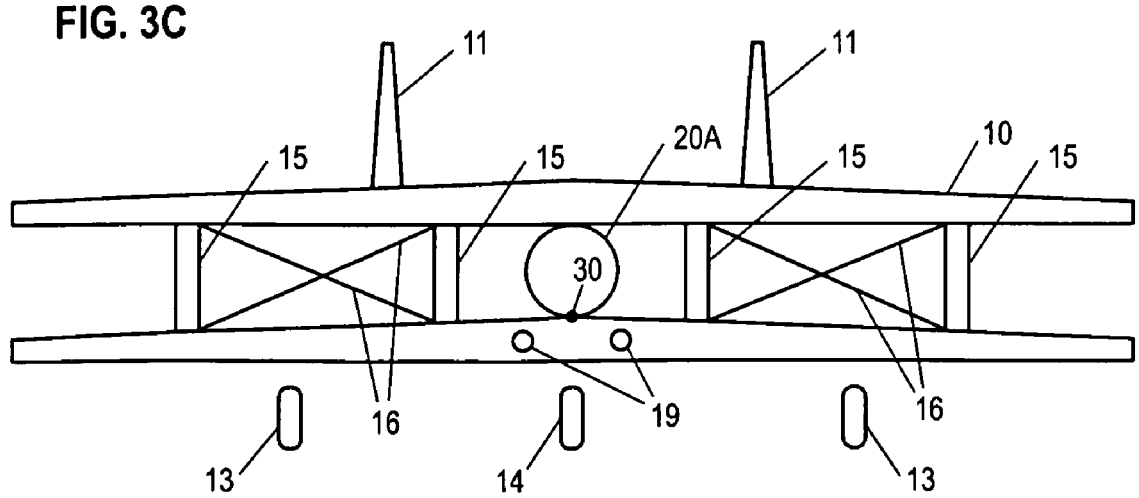

A number of embodiments are illustrated ins FIGS. 3A, 3B, and 3C. FIG. 3A is a rear view of the AP in the form of a delta-wing glider in conjunction with ballistic rocket carried on the upper surface of the AP; FIG. 3B is a rear view of the AP in the form of a delta-wing glider in conjunction with ballistic rocket carried on the lower surface of the AP, and FIG. 3C is a rear view of the AP in the form of a biplane delta-wing glider with ballistic rocket carried between the upper and lower wings.

FIG. 3A—Vehicle Carried on Upper Surface of AP:

The vehicle (rocket or spaceplane) may be carried on the upper surface of AP 10 as shown in FIG. 3A when the vehicle is rocket 20A. This is more suitable for heavier vehicles because the structure of the AP itself can provide additional support for the vehicle, thus reducing the load on hold-and-release mechanism 30. The AP is implemented as a delta-wing glider with aspect ratio close to unity, which ensures enhanced mechanical strength, thus minimizing the weight of the AP. AP 10 has two vertical fins 11 and a suitable airplane landing gear (wheels) 13 and 14 to enable it to take-off from a runway or aircraft carrier. Rocket 20A is mounted in a longitudinal notch 17 so that its center of gravity is as close to the center of aerodynamic pressure of the AP as practicable in order to reduce the moment arm of the thrust vector of the AP. This reduces or eliminates undesirable pitching moment.

FIG. 3B—Vehicle Carried on Lower Surface of AP:

Alternatively, the vehicle (rocket 20A) may be carried underneath the AP, as shown in FIG. 3B. This provides better conditions for the separation of the vehicle due to the gravity component across the flight path. The AP is implemented as a delta-wing glider with two fins 11. The aspect ratio of the wing is close to unity, which ensures enhanced mechanical strength, thus minimizing own weight of the AP. In this case, AP 10 has landing gear components 13 and 14 with longer struts to accommodate the vertical cross-dimension of the vehicle. Also, splitting the nose gear into two separate nose gear components 14 is necessary in order to provide an unobstructed path for forward motion of vehicle 20A after separation from the AP 10. A longitudinal notch 17 serves the same purpose as in FIG. 3A and provides better positioning of the center of gravity of rocket 20A to reduce an undesirable diving moment.

FIG. 3C—Multi-Winged AP:

To further increase the available wing area within given dimensional constraints, the design of the AP may include more than one wing, as illustrated in FIG. 3C for a biplane configuration and where the vehicle is rocket 20A. Here the AP 10 has a delta-wing planform with aspect ratio close to unity. It has two parallel (upper and lower) wings, two fins 11 and a suitable airplane landing gear 13, 14. Wing struts 15 and wing wires 16 serve as compression and tension members, respectively, to ensure rigidity of the biplane wing structure.

Figure 4A:
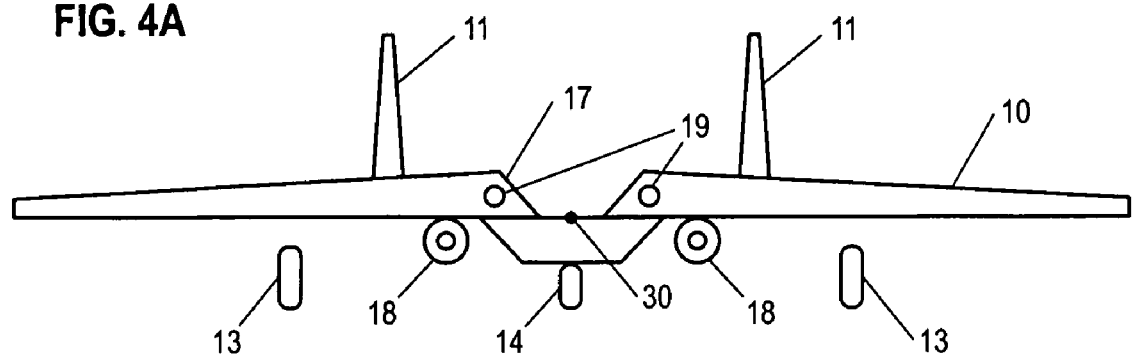
FIGS. 4A to 4C are views of the AP embodiments of FIGS. 3A to 3C in a self-transportation mode, with low-power strap-on propulsion means in the form of jet engines.
Figure 4B:
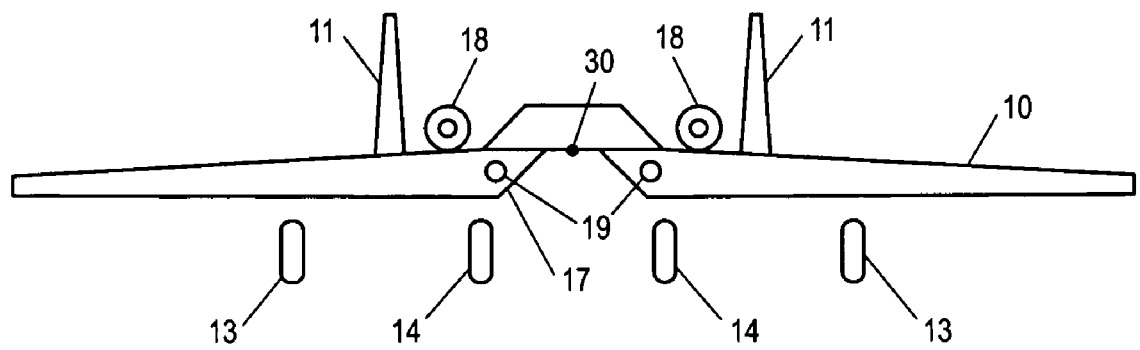
Figure 4C:
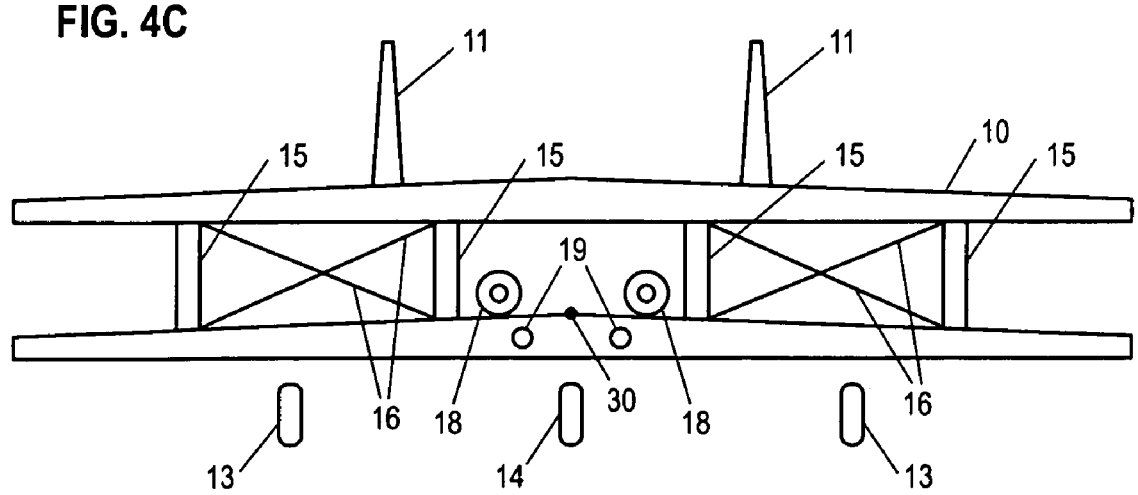

FIGS. 4A, 4B, and 4C—AP with Self-Transportation Means:

FIGS. 4A to 4C show embodiments of AP 10 similar to those depicted in FIGS. 3A to 3C but without the payload attached. Instead, a low-power strap-on propulsion means 18 is provided for purposes of short-distance self-transportation, flight back to launch site, and test flights. The propulsion means in FIGS. 4A to 4C are suitable jet engines. The AP is implemented as a delta-wing glider with aspect ratio close to unity, which ensures enhanced mechanical strength, thus minimizing the weight of the AP. AP 10 has two vertical fins 11 and a suitable airplane landing gear (wheels) 13 and 14 to enable it to take-off from a runway or aircraft carrier. A longitudinal notch 17 shown in FIGS. 4A and 4B positions the center of gravity of the vehicle to be launched as close to the center of aerodynamic pressure of the AP as practicable in order to reduce the moment arm of the thrust vector producing undesirable pitching moments. The embodiment shown in FIG. 4C has two parallel (upper and lower) wings, two fins 11 and a suitable airplane landing gear 13, 14. Wing struts 15 and wing wires 16 serve as, correspondingly, compression members and tension members to ensure rigidity of the biplane wing structure. A hold-and-release mechanism 30 is not used during self-transportation.

Operation—FIGS. 3A to 3C and 4A to 4C

Operation of the embodiments of FIGS. 3A to 3C is similar to that of the first to third embodiments. Roll-out, take-off, and climb of the AP-vehicle stack to separation point are conceptually identical to those of the first and embodiment. At the separation point, the propulsion system of the AP is shut down (burns out), hold-and-release mechanism 30 releases vehicle from AP, and the propulsion system of the vehicle 20A is activated (ignited). If vehicle is released downward, as in embodiment shown in FIG. 3B, its separation from AP is assisted by the gravity component across the flight path. After separation, the operation proceeds similarly with the operation of the first and second embodiments: AP glides back to the launch site for subsequent reuse or disposal being guided by its flight control system. The vehicle 20A proceeds along its ascent trajectory in conventional fashion.

In the self-transportation mode shown in FIGS. 4A to 4C, the AP is self-propelled and is not carrying a payload vehicle (not shown). Operations in this mode are intended for short-distance self-transportation, flight back to launch site, and test flights.

Advantages

From the description above, it becomes evident that one or more embodiments of my aero-assisted pre-stage retain the advantages of my non-powered, aero-assisted pre-stage. These advantages result from the capability of such embodiments to launch ballistic rockets and spaceplanes in a conventional airplane-like fashion, from a wide variety of conventional runways, with take-off airspeed comparable to, or lower than that of conventional jet airplanes. The advantages, for one or more embodiments are:

(a) The number of potential launch sites can be substantially increased.
(b) The waiting time for launch will be decreased due to above increase of the number of available launch sites.
(c) There will be increased flexibility in launch operations providing a capability to launch on demand, when and where necessary.
(d) A wider variety of space operators will have access to space due to the above increase of the number of available launch sites.
(e) The pace of development of space exploration and utilization for the needs of humankind as a whole will be enhanced.

In addition, the aero-assisted pre-stage has a substantial advantage over my non-powered aero-assisted pre-stage. Use of the propulsion system of the pre-stage ensures bringing the launch vehicle with 100% of its propellant to the separation point with obvious gains in altitude and velocity as compared with launching the launch vehicle from the ground. This implementation will result in definite increase of payload mass and/or altitude of the destination orbit (apogee of suborbital trajectory), as compared with a conventional ground launch.

CONCLUSION, RAMIFICATIONS, AND SCOPE

Accordingly, the reader will see that the AP, in one or more embodiments, will facilitate launch of ballistic and aero-assisted vehicles (spaceplanes) in an airplane-like manner from conventional airfields without dedicated ground-launch structures. Some common features of the embodiments of the AP are presented below:

The AP has own undercarriage, which relaxes requirements for the undercarriage of enables launch of ballistic rockets and spaceplanes, The wing area of the AP is not constrained by a requirement of sustained flight through the lower atmosphere, which greatly reduces the take-off airspeed, and as a result, makes it possible to launch ballistic rockets and spaceplanes from conventional runways, The wing planform of the AP is not constrained by requirement of a prolonged flight through lower, dense atmosphere, thus a wide variety of planforms becomes possible, in particular, those with aspect ratio close to unity, such as delta wings having enhanced mechanical strength, thus minimizing own weight of the AP.

Also, use of the AP increases performance of the launch vehicle in terms of payload mass and/or altitude of destination orbit (suborbital trajectory).

Correspondingly, the number of potential launch sites will increase substantially, reducing the waiting time for launch, increasing flexibility in launch operations, opening the access to space to a wider variety of potential space operators, and as a result, increasing the pace of space exploration and utilization.

While the above description contains many specificities, these should not be construed as limitations of the scope of any embodiment, but as exemplifications of the presently preferred embodiments thereof. Many other ramifications and variations are possible within the teachings of the various embodiments. For example:

Take-off of the AP-vehicle stack and landing of the AP can be performed on a runway, aircraft carrier, or suitable body of water.

Transportation of the AP to the launch site can be performed in a disassembled form using a conventional aircraft.

Other alternatives, applicable to the embodiments described above, include:

Reusable v. expendable AP: Depending upon the mission, the fly-away cost of AP may represent an insignificant fraction of the total cost of the mission; in this case reuse of AP may not be justified.

The contour of the wing as viewed from above (wing planform) of the AP: The planform may be chosen from a variety of geometrical shapes comprising triangular, bi-trapezoidal, rectangular, and elliptical.

Landing gear: Depending upon the vehicle to be launched and the mission profile, the landing gear may be retractable, fixed (including wheels, floats, air cushions, and skids), or absent (in the case of a spaceplane carried on the bottom of the AP, when the landing gear of the spaceplane is used for the take-off of the stack).

Flight control of AP: There are several flight-control possibilities, which can be used separately or in combination:

Flight control throughout the flight of the AP can be conducted autonomously by the onboard computer of AP—this approach is widely used for flight control of unmanned aerial vehicles (UAVs), Flight control throughout the flight of the AP can be conducted from the ground or air, by an automated system or a human operator, or by a combination of thereof, Flight control can be conducted from vehicle carried by AP, at least until separation.

Solid rocket motors v. liquid rocket engines in the propulsion system of the AP: Depending on the application, the propulsion system of the AP can use either solid rocket motors or liquid rocket engines.

All the varieties of possible embodiments of the AP lie well within the common engineering knowledge in the aerospace industry, and the AP can be built using conventional tools and fabrication processes routinely used in this industry.

Other ramifications in size, style, arrangement, and applications for the AP are possible. Thus, the scope should be determined by the appended claims and their legal equivalents, and not by the examples given.

I claim:

1. An aero-assisted pre-stage for launch of single-stage and multiple-stage space vehicles, comprising:
   a. an airframe to which a space vehicle is attached to form a stack, said airframe having an aerodynamic shape capable of providing aerodynamic lift sufficient for take-off at subsonic airspeeds and ascent of said stack using propulsion of said pre-stage,
   b. short-burn rocket propulsion means mounted to said airframe for providing thrust to said stack, said thrust being sufficient for take-off and ascent of said stack to a separation altitude,
   c. said airframe having a planform suitable for launch and transport of said space vehicle to said separation altitude,
   d. said airframe having an undercarriage for enabling roll-out of said stack at take-off,
   e. said airframe having a flight control system for providing flight control of said stack and glide of said airframe after separation, and
   f. said airframe having a hold-and-release mechanism for holding said vehicle to said airframe and releasing said vehicle as soon as said separation altitude is reached,
   whereby said aero-assisted pre-stage enables said vehicle to be launched from runways in a horizontal take-off fashion.

2. The aero-assisted pre-stage of claim 1 wherein said airframe has a delta-wing planform.

3. The aero-assisted pre-stage of claim 2 wherein the structure of said airframe has a longitudinal notch to accommodate the thrust vector of said vehicle to be launched, said notch being adjacent the center of gravity of said airframe.

4. The aero-assisted pre-stage of claim 2 wherein said airframe comprises more than one wing to increase the total wing area and reduce take-off airspeed.

5. The aero-assisted pre-stage of claim 1 wherein said undercarriage for providing roll-out is selected from the group consisting of wheels, floats, air cushions, and skids.

6. The aero-assisted pre-stage of claim 1 wherein said hold-and-release mechanism is located on an upper or lower surface of said airframe.

7. The aero-assisted pre-stage of claim 1 wherein said airframe is converted from an airframe of a pre-existing aircraft with necessary modifications for preventing the exhaust plume of the engine of said space vehicle from damaging said pre-stage and to ensure unobstructed release of said space vehicle at the separation point.

8. The aero-assisted pre-stage of claim 1 wherein said airframe has low-power propulsion means selected from the group consisting of engine-driven propellers, jet engines, and rocket engines, for short-distance self-transportation, flight back to launch site, and test flights.

9. The aero-assisted pre-stage of claim 1 wherein said space vehicle is selected from the class comprising ballistic rockets and aero-assisted flight vehicles.

10. An aero-assisted pre-stage for launch of single-stage and multiple-stage space vehicles, comprising:
    said pre-stage having short-burn rocket propulsion means mounted thereon, said means providing thrust sufficient for take-off and ascent of said pre-stage with a space vehicle to separation altitude,
    said propulsion means being selected from the class consisting of liquid rocket engines and solid rocket motors,
    ascent-assisting means to which said space vehicle is attached to form a stack, said ascent-assisting means providing aerodynamic lift sufficient for take-off and ascent of said vehicle using said propulsion means of said pre-stage,
    said ascent-assisting means having an undercarriage to provide roll-out of said stack at take-off,
    said ascent-assisting means having a flight control system for providing flight control of said stack and glide of said ascent-assisting means after separation, and
    said ascent-assisting means arranged to hold said space vehicle to said ascent-assisting means and to release said ascent-assisting means as soon as said separation altitude is reached,
    whereby said ascent-assisting means provides a capability to launch said vehicle from airport runways, with a subsonic take-off airspeed.

11. The aero-assisted pre-stage of claim 10 wherein said ascent-assisting means has a delta-wing planform.

12. The aero-assisted pre-stage of claim 11 wherein said ascent-assisting means has a longitudinal notch to accommodate a thrust vector of said vehicle to be launched, said notch being adjacent the center of gravity of said airframe.

13. The ascent-assisting means of claim 11 wherein said ascent-assisting means comprises more than one wing to increase the total wing area and reduce take-off airspeed.

14. The aero-assisted pre-stage of claim 10 wherein said ascent-assisting means includes roll-out means selected from the group consisting of wheels, floats, air cushions, and skids.

15. The aero-assisted pre-stage of claim 10 wherein said ascent-assisting means includes hold-and-release means on an upper or lower surface of said airframe.

16. The aero-assisted pre-stage of claim 10 wherein said ascent-assisting means has been converted from an airframe of a pre-existing aircraft with modifications for preventing the exhaust plume of the engine of said space vehicle from damaging said pre-stage and to ensure unobstructed release of said space vehicle at the separation point.

17. The aero-assisted pre-stage of claim 10 wherein said ascent-assisting means includes low-power propulsion means selected from the group consisting of engine-driven propellers, jet engines, and rocket engines, whereby said low-power propulsion means can provide short-distance self-transportation, flight back to launch site, and test flights.

18. The aero-assisted pre-stage of claim 10 wherein said ascent-assisting means is arranged to hold a space vehicle selected from the class comprising ballistic rockets and aero-assisted flight vehicles.

* * * * *